June 26, 1962 C. G. BEAUDETTE 3,041,599
SHAFT ANGLE ENCODING
Filed Aug. 18, 1959
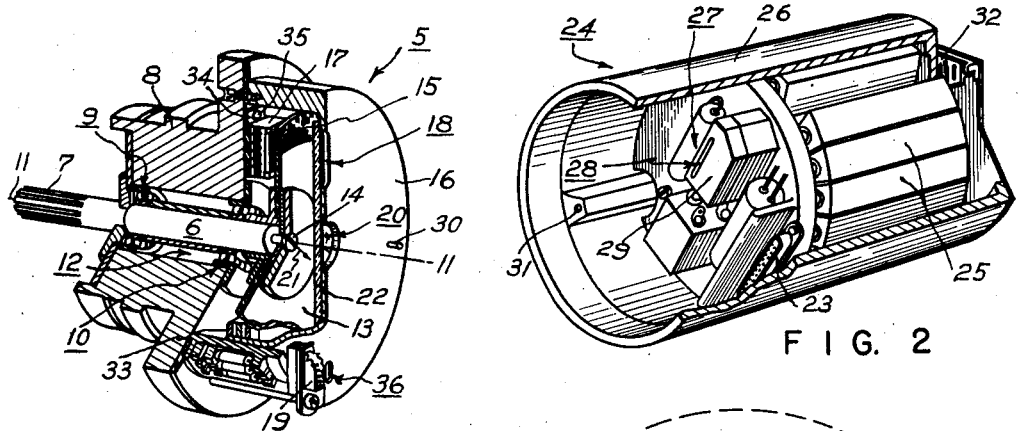
FIG. 1
FIG. 2
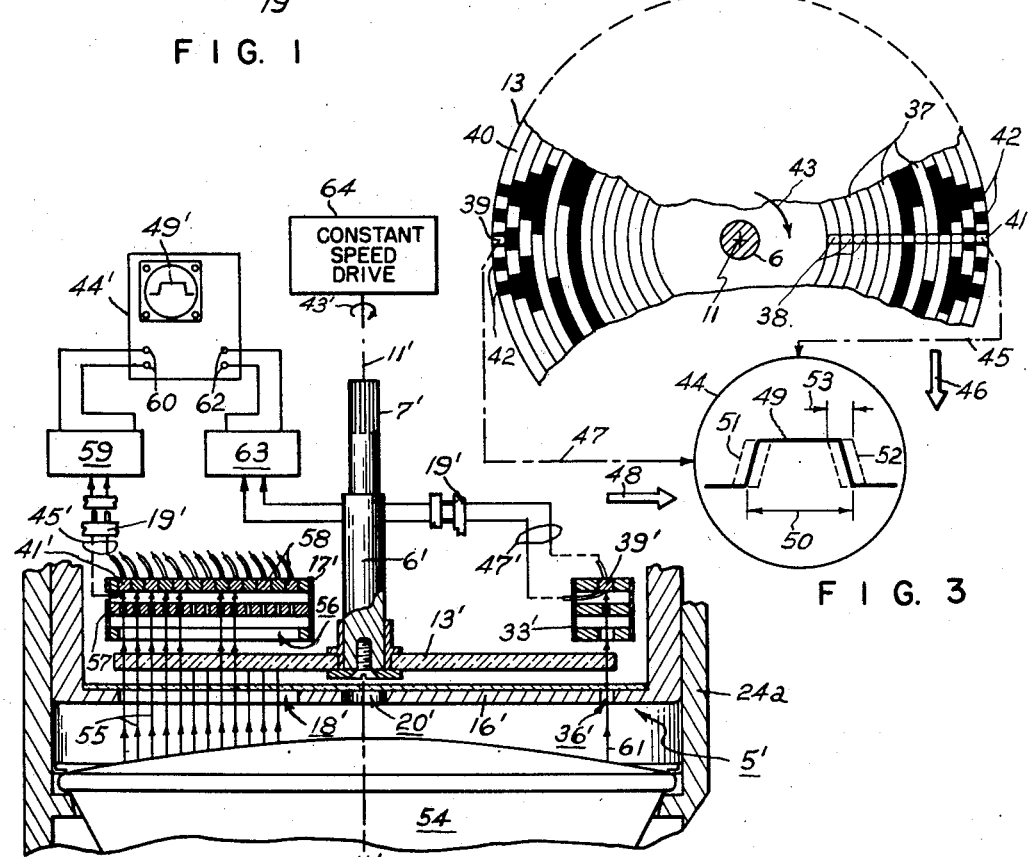
FIG. 3
FIG. 4
INVENTOR.
CHARLES G. BEAUDETTE
BY
Dike, Thompson & Bronstein
ATTORNEYS dette, Jamaica Plain, Mass., assignor, by
United States Patent Office 3,041,599
Patented June 26, 1962

3,041,599
SHAFT ANGLE ENCODING
Charles G. Beaudette, Jamaica Plain, Mass., assignor, by mesne assignments, to Computer Control Company, Inc., Framingham, Mass., a corporation of Massachusetts
Filed Aug. 18, 1959, Ser. No. 834,459
7 Claims. (Cl. 340—347)

The present invention relates to the electrical digital encoding of shaft angles and, in one particular aspect, to improved precision optical encoders integrally incorporating optical alignment provisions for self-gauging of concentricity.

As is well understood in the art of angular position measurements, optical shaft angle encoding devices can offer the advantages of high precision, rapid and positive responses, elimination of movable contacts, and outputs directly in the electrical digital form preferred for some purposes. Accurate measurement of the absolute angular orientations between relatively movable elements, and the direct conversion of angular analogue data into electrical digital signals for digital computers, are examples of important uses for which such encoders are particularly well suited.

In a conventional form, the encoder employs a light-transmitting disk having a number of concentric annular tracks along each of which there is distinctive masking which creates a desired cyclic binary pattern. The coded disk is mounted for rotation with a support shaft, the angle of which is characterized by a photoelectric readout assembly responding to the light-transmitting pattern of the disk only along a sharply-defined radius, such that even the slightest eccentricities of the relatively rotatable parts tend to produce directly proportional measurement errors. It has therefore been a manufacturing practice to evaluate the assembled shaft and disk in a special test fixture having support bearings with lowest errors in concentricity and, when the required alignment of shaft and disk is exhibited, to remove the assembly from the fixture and install it within the support bearings of the encoder which it is to serve. However, such an evaluation provides no assurance of the concentricity qualities of the assembly in its operational environment in the encoder, and, in fact, the resulting encoder errors due to eccentricities can then actually be magnified by the amounts of eccentricity in the test fixture bearing structure. This testing can be performed only prior to the final assembly and cannot be repeated for periodic inspection purposes without involving extensive disassembly which must be restricted to highly skilled personnel. These difficulties and limitations are avoided in accordance with the present teachings by causing the optical converter to function not only as its own assembly test fixture but also as a permanent self-contained gauge which enables precise concentricity inspections at any time during the life of the equipment without disturbance of its sensitive mechanisms.

It is an object of this invention, therefore, to provide improvement in accuracy and convenience of assembly and inspection of optical shaft angle digitizers.

A further object is to provide improved constructions of shaft angle encoders which permanently incorporate self-gauging facilities requiring only relatively coarse adjustment for the inspection of mechanical concentricities with very high precision during and after manufacture.

Another object is to provide a shaft angle encoder of low manufacturing cost in which an element of the photoelectric readout assembly cooperates with a simple built-in auxiliary photoelectric detector element to characterize mechanical alignment errors.

By way of a summary account of practice of this invention in one of its aspects, an encoder device is designed to include two principal sub-assembly sections which may be connected together to cooperate in developing electrical output signals in digital form uniquely characterizing each increment of angular orientations of an input shaft. The components of controlling effect upon measurement accuracy, including the input shaft, precision bearings, coded disk and photoelectric readout cells and shields, are mounted upon the framework of but one section. Concentricities of the relatively rotatable arts in this one section are cardinal importance. A flash-lamp illumination source and a number of compact electrical amplifiers for the outputs of the readout cells are conveniently packaged within the casing of the other section of the encoder, the two sections being arranged for both mechanical and electrical interconnection. In the fabrication of the input section, the readout cell assembly and a separate single auxiliary alignment cell are positioned upon the framework at positions which correspond generally to diametrically opposite positions underlying a diameter of the coded disk when the center of its coded pattern is exactly aligned with the center of shaft rotation. With the shaft and disk mounted in the framework in precision bearings affording no lateral play, and while directing illumination toward the cell through the coded disk, the alignment cell and readout cell assembly are coarsely adjusted upon the framework until the electrical outputs therefrom at the diametrically opposite positions show they are properly oriented to respond to the codings at the diametrically opposite points. The input shaft is then rotated at a substantially constant speed while the changes in phase, if any, of the cell pulse outputs at the diametrically opposite points are displayed upon the screen of a cathode ray oscilloscope. Adjustment of the disk upon its shaft is made until the aforesaid phase changes are eliminated or reduced to a permissible maximum, and the detector assembly is later enclosed and sealed by an opaque cover provided with light-transmitting apertures at the sites of the readout and alignment cells.

The subject matter regarded as my invention is particularly pointed out and distinctly claimed in the concluding portion of this specification. However, both as to preferred structure and assembly, and further in relation to objects and advantages thereof, this invention may best be understood through reference to the following description taken in connection with the accompanying drawings, wherein:

FIG. 1 is a pictorial view, with parts broken away, of an optical-mechanical input section of a shaft angle encoder for practice of the invention;

FIG. 2 is a partially cut-away pictorial view of an encoder section including amplifier and illumination source components for cooperation with the input section of FIG. 1, the FIG. 2 illustration being on a somewhat reduced scale;

FIG. 3 portrays schematically the operational relationships between a coded disk, readout and alignment cells, and measurement display device performing a concentricity inspection; and FIG. 4 illustrates details of an encoder input section, such as that of FIG. 1, in cooperation with display and illumination apparatus during a concentricity inspection.

The embodying apparatus appearing in FIG. 1 comprises a subassembly 5 serving as the input section of a shaft angle digitizer, the input shaft 6 thereof having a coupling section 7 disposed outside the subassembly framework 8 through which it may be angularly oriented by a primary shaft turning about a measurement axis, or by a synchro repeater, or the like. Two sets of precision bearings, 9 and 10, support the input shaft within the framework for rotation about an axis 11—11, the actual locus of this axis being unknown because it is governed by concentricity characteristics of the particular bearings used and by the extents to which the input shaft and the accommodating bore 12 in the framework are truly linear.

A coded transparent disk 13 is secured to the inner end of the input shaft, by adjustable fastener provisions including the bolt 14 and a washer and bushing, and is designed to rotate with the shaft about the actual axis of relative rotation 11—11. As has been noted, this axis unfortunately can not be taken to be coincident with the longitudinal axis of the shaft. In a preferred form, disk 13 is of glass and is masked on its front surface by opaque markings 15 which appear as sectors of concentric annular paths of the same radial width. Suitable cyclic binary patterns are known which establish unique combinations of opaque and transparent markings along different radii of the disk, the angular resolution depending upon the number of concentric paths which are marked. One of these is marked upon disk 13, and its outermost path, as shown, includes fine opaque markings alternated with transparent spaces of the same minute angular width. Information as to the shaft and disk angle can be derived from the distinctive codes of opacity and transparency along a fixed radius, and to this end there are provided the radially-slotted cover 16 and radial array 17 of photoelectric readout cells. Cover 16 is opaque, except for certain light-transmitting passages, and is secured to and sealed in dust-tight relationship with the framework 8 such that it shields the sensitive mechanism against contamination and the optical system against disturbances by ambient illumination. The narrow elongated radial slit 18 admits excitation illumination from either a flashlamp or test lamp outside the cover and permits a narrowed beam of light to strike the disk and radial array of readout cells only along a relatively fine radius. Provided the individual photoelectric readout cells and associated light shields in array 17 are properly oriented in relation to the disk, a plurality of electrical signals will be developed by the cells each of which corresponds to the opacity or transparency of a different one of the concentric paths at that radius. These discrete signals appear at the terminal pins of an external connector 19 and are available for interpretation as shaft angle data by an electronic computer of a known form. A central zeroing aperture 20 is also preferably included, whereby a reference mask 21 on the shaft assembly may be sighted to establish whether a wanted initial setting of the shaft is achieved in relation to the measured member to which it is being coupled. Transparent window 22 closes the light-transmitting apertures to aid in preserving the sealing against contaminants.

Connector 19 cooperates with a mating connector assembly 23 in the second subassembly section 24 of FIG. 2, thereby communicating the patterns of photoelectric readout signals to the miniaturized preamplifiers 25. Each of these amplifiers constitutes a part of a separate electrical channel associated with each of the photoelectric readout cells. The casing 26 of section 24 is shaped to mate firmly with the cover and framework of the input section 5 in FIG. 1, although illustrated on a different scale in FIG. 2. Recessed inwardly of the front end of subassembly 24 is a flashing light source 27 which provides short repetitive pulses of light from a known type of gas-discharge lamp (not visible in the drawings) disposed behind the narrow slit 28 of a shield 29. Locating pin 30 and recess 31 of sections 5 and 24, respectively, insure that the periodically varying illumination from slit 28 will be properly directed through slit 18 and on through the disk 13 to the readout cell array 17 when the sections are joined. Connector 32 provides coupling of electrical excitations into and electrical digital data out of the encoder.

The optical readout system, including the slits, shields and cells, is mechanically fixed in relation to the stationary framework of the encoder, and any departure of the center of the coded disk pattern from the axis of actual relative rotation directly results in error in the angular measurements. Others have sought to avoid such errors by precisely centering the disk with the shaft axis. For this purpose, test fixtures have been devised with shaft support bearings of very low concentricity error, and the shaft and disk assemblies have been carefully centered under closely controlled measurement conditions before being introduced into the encoder framework. The present teachings recognize that the foregoing practice is seriously imperfect in that the bearings and the shaft and bearing bores in the particular encoder with which any shaft-disk assembly is to be used may have concentricity characteristics vastly different and poorer than those of the test fixture. Moreover, even the most accurate test fixture will include some concentricity errors of its own, and a shaft-disk assembly centered upon such a fixture will inherently carry these concentricity errors into and add them to the errors of the encoder into which it is transferred. Accordingly, each encoder is instead caused to serve as its own assembly test fixture, its shaft being mounted in the encoder bearings and its coded disk being centered upon the shaft as dictated by concentricity inspections made during the assembly procedure. This then avoids the errors of any bearings and supporting framework other than those of the actual encoder environment with which any shaft-disk assembly is to be used, but there remains the problem of making highly accurate concentricity measurement of the installed assembly. Maximum advantage cannot be realized unless the concentricity can be gauged to have at least as low an error as when the shaft-disk assembly is moved into the encoder from a separate outside test fixture. Installation of the shaft-disk assembly leaves almost no space for the addition of accurate gauging equipment, of course; but, even if some space could be sacrificed for gauging, it would then be expected that the gauging equipment would itself have to be centered in relation to the bearings and bore of the framework, such that no real advantage accrued.

However, according to this invention, special photoelectric concentricity inspection provisions circumvent both the aforesaid space and gauge-centering difficulties, while at the same time adapting a portion of the existing photoelectric readout unit to added inspection purposes. These provisions involve a small auxiliary photoelectric cell unit 33 (FIG. 1) which is adjustably mounted on the input section framework at a position substantially diametrically opposite the photoelectric readout cell array 17. The casing of readout cell array 17 is illustrated as having a bracket 34 which cooperates with adjustment bolts such as bolt 35 to permit the array to be adjusted somewhat and then securely fastened in position radially and angularly in relation to the axis 11—11. The casing cell unit 33 is provided with similar adjustable fastener elements permitting small radial and angular adjustments, although these are not visible in the FIG. 1 cut-away view. A proportionately small aperture 36 admits illumination to reach cell unit 33 from outside the cover 16 and, thence, through the outermost concentric coded track of the disk 13. Single cell unit 33 is of no greater size than the readout array 17 and is readily accommodated between the disk and framework at the diametrically opposite position. Its electrical output data is also conveniently made available at connector 19.

The manner in which the output signals characterize both the shaft angle and concentricity information is readily understood through reference to the schematic representations in FIG. 3. Diametrically opposed portions of the coded disk 13 are shown, with masked opaque codings being illustrated in part in some of the thirteen concentric annular paths 37. Input shaft 6 is depicted, together with the locus of the axis of relative rotation 11—11, it being understood that the paths 37 should be accurately concentric with this axis to avoid introducing troublesome measurement errors in the output of the photoelectric readout array. The optics and photoelectric structure of the readout system are symbolized in the thirteen discrete but radially aligned dots 38. A like dot 39 designates the auxiliary photoelectric unit. At the site of each of the dot symbols 38 a narrow beam of light form the flash-lamp is either transmitted or blocked, depending upon the unique pattern of opacity and transparency of the masking exhibited by the disk in that angular orientation. Furthermore, in the outermost code path 40, at the position of dot symbol 41, the outermost cell of the readout array 17 will respond alternately to the blocking and transmission of light controlled by equally-spaced equal width marks 42 as the disk is rotated. Likewise, the diametrically, opposite auxiliary cell at the position of symbol 39 can be made to respond alternately to the blocking and transmission of light under control of these same marks in the same code path as the disk is rotated by its shaft 6 in one direction as suggested by arrow 43.

With unvarying illumination applied in the directions of both of these cells, they will develop electrical output signals in the form of pulses of about the same width. Provided that the two cells are of identical photoelectric responses and are radially and angularly disposed in precisely the same orientations relative to the diametrically opposite marking 42, they can deliver output pulses of the same amplitudes and widths. Fortunately, these characteristics are not important to concentricity inspection, and it is sufficient that the two diametrically opposed cells be set to respond to the diametrically opposite marks in a clearly detectable manner. This means that the cell casings of array 17 and unit 33 need merely be manipulated in relatively coarse adjustments until the outputs of these cells signifies they are responding in this manner, whereupon their bracket bolts may be tightened to secure them permanently in the adjusted positions. Information concerning eccentricity, if any, about axis 11—11 appears in changes in the phase relationships between the electrical output pulses from the opposed cells. Eccentricities cause the pulses to shift phase cyclicly as the disk is rotated, the phase change being greater as the eccentricity increases. Measurements of these phase shifts therefore serve as a guide to the adjustments of the disk 13 on input shaft 6, the two being fastened securely by bolt 14 when the phase shift is at a minimum. It is then known that the coded pattern and axis of relative rotation are truly concentric in the actual operating environment and that coding errors due to eccentricities are avoided. Preferably, the critical phase relationships are displayed by the traces of the pulse signals upon the screen of an oscilloscope 44. One suitable display is created by exciting the oscilloscope with a vertical deflection signal applied over the coupling 45 from the outermost cell of the readout array, the vertical deflection being suggested by arrow 46, and by triggering a fixed horizontal sweep in the oscilloscope from the output of the opposed alignment cell applied over coupling 47. Arrow 48 signifies the latter periodic sweep. Rotating of shaft 6 must be preserved at a substantially constant speed during the inspection, and if this is done the trace 49 is of a substantially fixed width 50. Eccentricities are then evidenced by shifts in positions of the leading and trailing edges of the traces, as is represented by dashed lines 51 and 52, and the maximum extent of phase variation, 53, is a direct indication of the extent of eccentricity.

The improved practice and construction as thus far described are adhered to during the initial assembly, to secure optimum concentricity while entirely obviating the need for accessory test fixtures for such purpose. Thereafter, with the apertured cover secured in place, the input section embodies self-contained provisions for gauging its own concentricity characteristics. Ready inspection can then be made at any time following shipment, rough handling, and exposures to prolonged use and severe environmental conditions. In FIG. 4 there is shown an arrangement for such an inspection which takes advantage of the self-contained test facility. Only part of the input section has been portrayed, in interests of simplicity and clarity, and insofar as the elements correspond to those of the apparatus in FIGS. 1 and 3 they are designated by the same reference characters with a distinguishing single-prime accent added. The illumination for both the readout cell array 17' and auxiliary alignment cell unit 33' is provided by a direct-current lamp and lens combination 54 for directing the light output in a parallel-ray beam, the combination being shown in the convenient form of a small sealed-beam lamp. Preferably, the effects of ambient illuminations are avoided by the housing of lamp 54 in a casing 24a which mates with input section cover 5' in the manner of casing 24 of FIG. 2. The band of rays 55 directed toward the readout array 17' are illustrated in their travel through the cover slit 18' and onto the masked disk 13' where some are obstructed in the same manner as when the light source is a flash lamp and the device is operational for encoding. The casing of cell array 17' likewise includes a narrow slit 56 and a further light shield 57 having small openings distributed in a linear path where rays intended to impinge upon different ones of the individual cells 58 are isolated from unwanted stray illumination. The cells 58 are arranged to yield separate electrical output signals and may be of known types, such as those which either generate signals or vary their impedance as illumination impinges upon them. Outermost cell 41' exercises its control in the circuit of coupling 45', and amplifier 59, and one of the outputs 60 to the oscilloscope 44'. Alignment cell 33' is of like construction and responds to rays such as that marked 61 to exercise its control in the circuit of the input 62 to oscilloscope 44', an intermediate amplifier 63 being used if desired. The display of phase relationships between the pulse outputs of the diametrically opposite cells may be other than that mentioned, it being obvious, for example, that either of the two cells may provide the sweep triggering, or that both pulses may be displayed together or in alternating sequence for observation of phase shifts. Other devices suitable for detecting changes in phase of pulses at the periodicities involved in the testing may be employed for indicating purposes also. Unless the input shaft 6' is rotated at a substantially constant speed, the time durations and periodicities of the pulses will vary and tend to disturb the phase measurements. Therefore, this shaft is rotated at such a speed, preferably a predetermined speed also, by a drive unit 64 coupled to the input shaft during the inspections. The drive need not be a separate unit where the device producing the measured input is itself capable of producing such a constant-speed input, of course.

It should be understood that while particular embodiments and practices of this invention have been shown and described herein, these have been presented in the nature of description rather than limitation, and it will occur to those skilled in the art that various changes, modifications, substitutions and combinations may be made within the province of the appended claims and without departure either in spirit or scope from this invention in its broader aspects.

What I claim as new and desire to secure by Letters Patent of the United States is:

1. The method of suppressing errors caused by eccentricities of the concentric annular masked patterns of a coded disk in relation to the true axis of relative rotation thereof in the frame of a shaft angle encoder, comprising the steps of assembling said disk on a support shaft and said shaft in the bearings of said frame, orienting first and second light-responsive cells on said frame in positions to respond independently to light transmitted through said disk at substantially diametrically opposite positions, simultaneously directing substantially unvarying light at said cells through said disk at said diametrically opposite positions, rotating said shaft at a substantially constant speed, measuring changes in phase relationship between electrical signals developed by said cells while said shaft is rotated, and adjusting said disk radially in relation to said support shaft to eliminate changes in said phase relationship.

2. The method of suppressing errors caused by eccentricities of the concentric annular masked patterns of a coded disk in relation to the true axis of relative rotation thereof in the frame of a shaft angle encoder, comprising the steps of permanently assembling an input shaft in bearings on said frame for rotation in relation thereto, mounting said disk on said shaft for rotation therewith and for radial adjustment in relation thereto, simultaneously illuminating said disk at positions which are substantially diametrically opposed, rotating said shaft at a substantially constant speed, detecting pulsations of light transmitted through said disk at each of said diametrically opposite positions while said shaft is rotated, detecting changes in the phase relationship between said pulsations, and adjusting said disk radially in relation to said input shaft in direction to eliminate said changes in said phase relationship.

3. The method of suppressing errors caused by eccentricities of the concentric annular masked patterns of a coded disk in relation to the true axis of relative rotation thereof in the frame of a shaft angle encoder, comprising the steps of permanently assembling an input shaft in bearings of said frame for rotation in relation thereto, mounting said disk on said shaft for rotation therewith and for radial adjustments in relation thereto, simultaneously illuminating said disk with light of substantially uniform intensity at positions which are substantially diametrically opposed and lie in the outermost of said concentric patterns, orienting first and second light-responsive electrical cells on said frame at the sites of said diametrically opposed positions, adjusting said cells in positions upon said frame to respond simultaneously to light transmitted through said outermost pattern while maintaining said disk stationary, rotating said shaft and disk at a substantially constant speed, measuring changes in the phase relationship between electrical signals developed by said cells while said disk is rotated, adjusting said disk radially in relation to said input shaft in direction to eliminate said changes in phase relationship, and permanently sealing said cells with said disk within an enclosure having light transmitting apertures for admitting light to said diametrically opposed positions.

4. Apparatus for converting shaft angle orientations into electrical digital data comprising an input shaft, a frame, bearings mounting said shaft in said frame for rotation in relation thereto, a coded disk mounted for rotation with said shaft and carrying concentric annular masking patterns which produce a distinctive code of opacity and transparency radially along each incremental angular portion of said disk, a first photocell mounted on said frame to have light transmitted through said disk only at substantially one angular position impinge thereon, a second photocell mounted on said frame to have light transmitted through said disk impinge thereon only at another angular position substantially diametrically opposite said one angular position, opaque protective cover means secured to said frame and enclosing said cells and disk, said cover means have a pair of narrow light-transmitting passages therethrough disposed to transmit light from outside said cover means through said disk at said oppositely disposed positions, and electrical connection means outside said cover means having independent electrical circuit connections with both of said photocells, whereby said photocells are disposed to provide electrical output signals the phase conditions of which characterize concentricity of said patterns about the axis of rotation thereof when said shaft is rotated at a substantially constant speed and while illumination is directed at said apertures.

5. Apparatus as set forth in claim 4 wherein said first photocell comprises one of a plurality of photocells in a radial array for readout of said coding, and wherein said first and second photocells are mounted upon said frame to receive light transmitted only through the same annular pattern of said disk.

6. Apparatus as set forth in claim 4 further comprising means for adjusting the mounting of at least one of said photocells upon said frame, whereby to provide adjustment permitting light to impinge upon said one of said cells from a selected part of said disk, and wherein said first and second photocells are mounted upon said frame to receive light transmitted only through the outermost annular pattern of said disk.

7. In apparatus for converting shaft angle orientations into electrical digital data and comprising an input shaft, a frame, bearings mounting said shaft in said frame for rotation in relation thereto, and a coded disk mounted for rotation with said shaft and carrying concentric annular masking patterns which produce a distinctive code of opacity and transparency radially along each incremental angular portion of said disk, the concentricity testing facilities comprising a photoelectric readout having a first photocell mounted on said frame to have only light transmitted through the outermost pattern of said disk and only at substantially one angular position impinge upon said photocell, an alignment photocell mounted on said frame to have only light transmitted through said outermost pattern of said disk impinge thereon only at another angular position substantially diametrically opposite said one angular position, opaque protective cover means secured to said frame and enclosing said cells and disk, said cover means have a pair of narrow light-transmitting passages therethrough disposed to transmit light from outside said cover means through said disk at said oppositely disposed positions, electrical connection means outside said cover means having independent electrical circuit connections with both of said photocells, means for rotating said input shaft at substantially constant speed, means for directing substantially parallel rays of light of substantially unvarying intensity through said passages, and oscilloscope means coupled with said first and alignment photocells to display the phase relationship between electrical output signals from said photocells.

References Cited in the file of this patent
UNITED STATES PATENTS

| | | |
|---|---|---|
| 2,405,430 | Kent | Aug. 6, 1946 |
| 2,436,178 | Rajchman | Feb. 17, 1948 |
| 2,754,678 | Stinger | July 17, 1956 |
| 2,793,807 | Yaeger | May 28, 1957 |

Disclaimer 3,041,599.—*Charles G. Beaudette*, Jamaica Plain, Mass. SHAFT ANGLE ENCODING. Patent dated June 26, 1962. Disclaimer filed Sept. 21, 1962, by the assignee, *Computer Control Company, Inc., a corporation of Delaware.*

Hereby enters this disclaimer to claims 1 and 2 of said patent.
[*Official Gazette October 9, 1962.*] .